Figure 1:
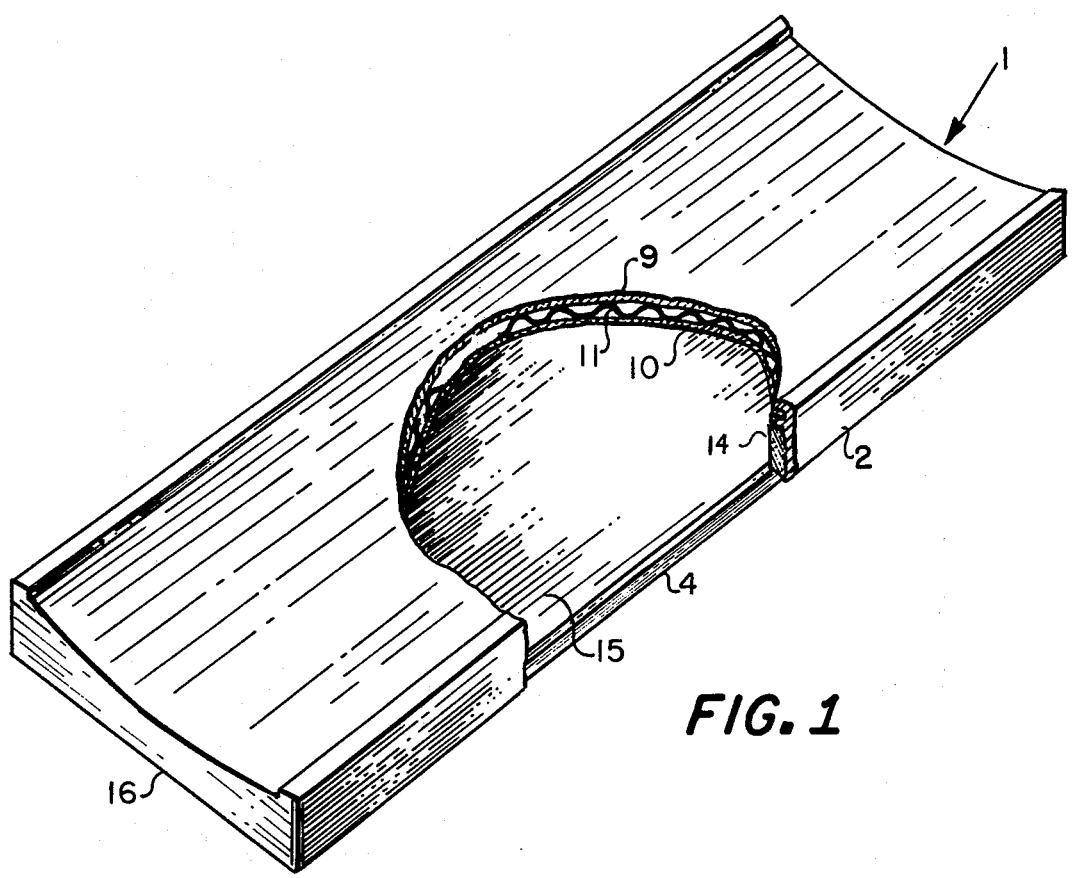

United States Patent [19]

Christopher

[11] 4,143,641

[45] Mar. 13, 1979

[54] SOLAR ENERGY COLLECTOR

[76] Inventor: John C. Christopher, 68 Charlonne St., Jaffrey, N.H. 03452

[21] Appl. No.: 799,113

[22] Filed: May 20, 1977

[51] Int. Cl.² .............................................. F24J 3/02
[52] U.S. Cl. ..................................... 126/270; 126/121
[58] Field of Search ................... 126/270, 271; 52/200, 52/573, 627, 398

[56] References Cited

U.S. PATENT DOCUMENTS

| 2,519,281 | 8/1950 | Presser et al. | 126/271 |
| 3,886,701 | 6/1975 | Bogaert | 52/200 |
| 3,921,352 | 11/1975 | Koopman | 52/200 |
| 4,015,585 | 4/1977 | Fattor | 126/271 |
| 4,015,586 | 4/1977 | Vroom et al. | 126/271 |
| 4,026,268 | 5/1977 | Bartos et al. | 126/270 |
| 4,046,133 | 9/1977 | Cook | 126/270 |
| 4,060,070 | 11/1977 | Harter | 126/271 |

FOREIGN PATENT DOCUMENTS 2299604  8/1976  France ..................................... 126/271

Primary Examiner—John J. Camby
Assistant Examiner—Larry I. Schwartz
Attorney, Agent, or Firm—Arthur S. Cookfair

[57] ABSTRACT

A solar energy collector for the entrapment of radiant energy from the sun or other energy source and the conversion thereof to usable heat energy comprises a radiant energy-transmitting cover panel assembly having an edge rail attached to at least a portion thereof and a radiant energy absorber held in spaced relation by a structural chassis side wall member having a channel portion adapted to receive and non-rigidly hold the edge rail of the cover panel assembly and allow for free linear and lateral expansion thereof.

9 Claims, 3 Drawing Figures

SOLAR ENERGY COLLECTOR

BACKGROUND OF THE INVENTION

This invention relates to an improved solar energy collector unit adapted for mounting on the exterior of buildings.

In recent years, increasing concern over depletion of conventional energy sources has resulted in increasing efforts to develop and utilize alternate energy sources. One result of such efforts has been the development of various solar energy collectors, designed to trap radiant energy from the sun and convert it to a more usable, distributable energy form. Such solar energy collectors are commonly mounted on the exterior walls or roof of a building and employed to heat a fluid, such as air or water, which may subsequently be distributed throughout the building. Such solar energy collectors generally comprise a glazing or transparent cover panel which permits the passage of a substantial portion of solar energy and a solar energy absorbing element. The cover panel and energy absorbing element are generally held in spaced relation by other structural members of the collector to permit passage therethrough of a fluid, such as air or water, to be heated in the collector and then distributed, directly or indirectly, for heat transfer within the building. The collector unit may be provided with means for fastening to the outside of the building or other structure to be heated thereby. In a typical location on the exterior of a building, such collectors are commonly exposed to considerable fluctuations in temperature. The collector is generally rigidly constructed and fastened to the building. Fluctuations in temperature cause expansion and contraction of material of the collector, commonly with a resultant distortion and/or loosening of the elements or members. In addition, since the various parts or members of the collector are commonly fabricated from different materials, having different thermal expansion characteristics, the resultant differential expansion and contraction may further increase such problems as the loosening of the various parts of the collector unit.

It is an object of this invention to provide a solar energy collector unit that is economical to fabricate, simple to install, and which provides improved resistance to deterioration from the effects of normal fluctuations in atmospheric temperatures. It is an additional object to provide a solar energy collector unit characterized by an interlocking non-rigidly attached glazing system which allows linear and lateral expansion of the glazing.

SUMMARY OF THE INVENTION

In accordance with this invention, a solar energy collector comprises (A) a cover panel, substantially transparent to a major portion of the spectrum of solar energy and preferentially opaque to infra-red radiations, and having an edge rail along at least a portion thereof, (B) a radiant energy absorber panel, and (C) at least one structural chassis sidewall member having a channel portion adapted to receive and non-rigidly engage the edge rail of the cover panel assembly.

Typically, the cover panel will be substantially rectangular in shape and have an edge rail along at least one edge and preferably along two parallel edges. The energy absorber panel is preferably substantially similar in size and shape to the cover panel. The two panels are held in spaced relation by structural side wall members to define a substantially box-shaped solar energy collector unit. One or more of the structural side wall members, and most preferably two opposing side wall members hold the cover panel, interlocking with the edge rail thereof, and provide a non-rigid glazing system which allows for thermal expansion and contraction.

For a more complete understanding of the present invention and the advantages thereof, reference is made to the accompanying illustrations wherein FIG. 1 is a perspective view, partially broken away, of a solar energy collector unit of this invention.

Figure 3:
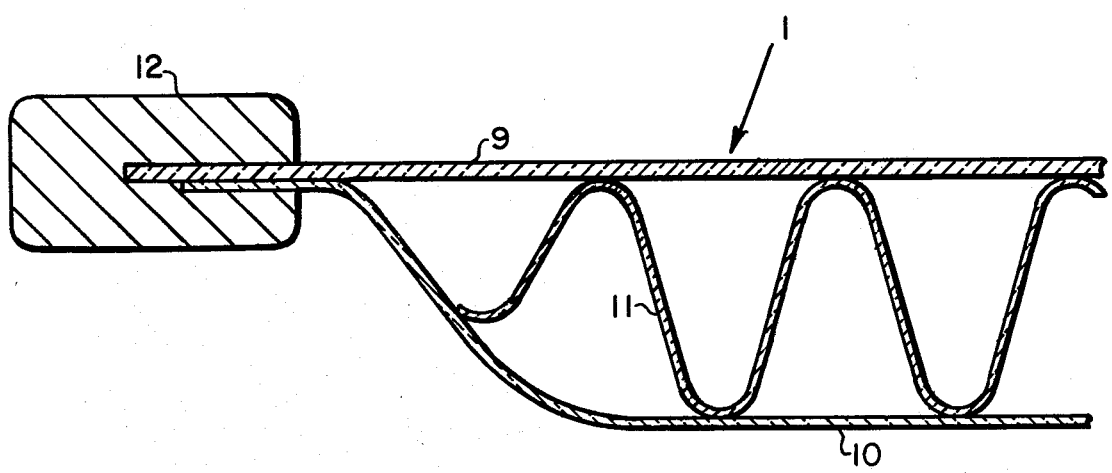
Figure 2:
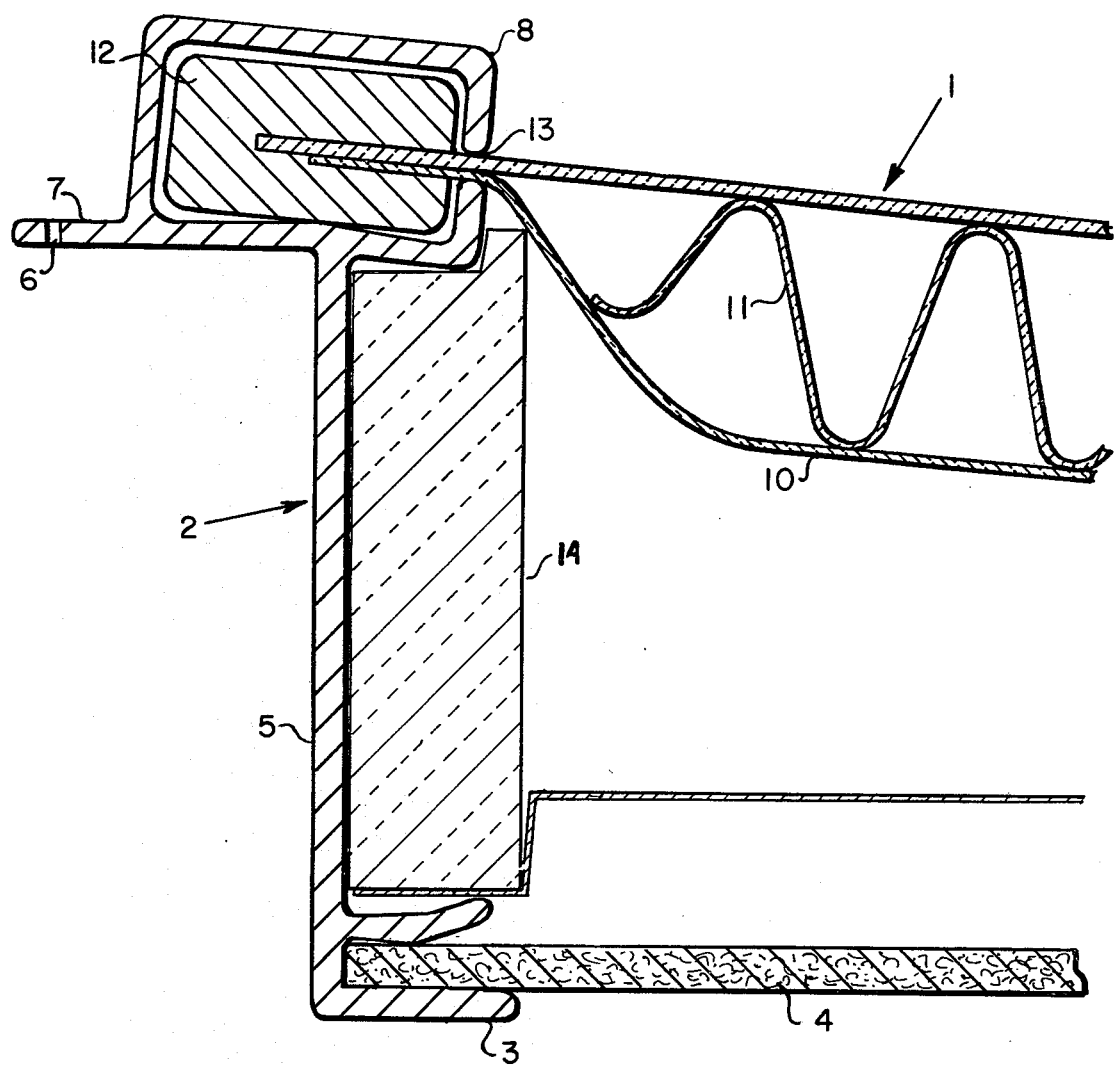

FIG. 2 is a cross-sectional view of a structural chassis side wall member showing edge portions of the cover panel and energy absorbing panel attached thereto; and FIG. 3 is a cross sectional view of the cover panel with edge rail attached thereto.

With reference to the drawings in greater detail, there is illustrated in FIG. 1, a solar energy collector unit in accordance with this invention, wherein a cover panel assembly 1 comprising an outer transparent pane or sheet 9, an intermediate, plated thin film 11 and an inner thin film 10 is held in spaced relationship to absorber panel 15 by structural chassis side wall members 2. The unit, forming a substantially rectangular box-shaped structure, is closed at each end by end caps 16.

The curved or convex shape of the cover panel 1 represents a preferred embodiment of the invention whereby the problem of heat distortion is minimized and direct reflection of solar energy from the outer surface of the panel is reduced. In addition the convex shape of the cover panel provides a further advantage is promoting drainage of rain water, etc. along the outer exposed surface.

The structure and features of structural chassis side wall member 2 are presented in greater detail in the cross-sectional view of FIG. 2. With reference to the drawing, the structural chassis side wall member 2 comprises a lower slotted flange 3 adapted to receive and hold the structural chassis back 4, a chassis web portion 5, and an upper channel portion 8 adapted to receive and non-rigidly hold, the edge rail 12 of the cover panel assembly 1. Opening 13 of channel portion 8 extends longitudinally, along the length of the channel, and is of sufficient size to permit at least the outer sheet of the cover panel to extend therethrough, but smaller than the diameter of the edge rail 12. Side insulation 14 controls heat loss to chassis side wall member 2.

Thus, the structural chassis side wall member 2 serves several functions. It provides a channel 8 for non-rigidly holding the cover panel 1 by means of edge rail 12 thus providing a glazing interlock mechanism which permits free linear and lateral expansion of the glazing system or cover panel assembly. It serves as a side wall of the solar collector unit. It provides an attaching means 3 for holding the structural chassis back 4 and serves as a spacer between the absorber panel and the cover panel 1. In addition, a structural mounting flange 7 provides a means for fastening of the solar collector unit, for example, between framing members such as roof joists. In a typical installation, the solar collector unit will be situated between roof joists with the mounting flange 7 resting on the top of the joist. The mounting flange 7 may additionally be provided with holes or slots 6 at spaced intervals along the length thereof, to facilitate attachment by nails, screws or other fastening means to the joists. The dimensions of the side wall member 2 may vary considerably. The length of the side wall member 2 will correspond approximately to the length of the collector unit. The height of the side wall member determines the depth of the collector unit, that is, the distance between the cover panel 1 and the absorber panel 15. Typically, the height of the side wall member 2, from the channel 8 to the attaching means 3 for the absorber panel will be about 1 to about 3 inches, although larger or smaller dimensions may be employed, if desired.

The side wall member 2 is preferably an aluminum extrusion, although various other materials, such as plastic, sheet metal or the like may be employed if desired.

The absorber panel 15 comprises a plate supported above the structural chassis back 4. The structural chassis back 4 may be fabricated from a wide variety of structural materials, such as hardboard, plastic, metal, wood, or the like, and preferably hardboard. The absorbing surface member 15 is preferably metal, and most preferably aluminum, although various other materials such as plastic, wood, paper or the like may be employed. The surface of the absorbing surface member 15 is preferably darkened or blackened, for example, by coating, such as painting, or anodizing, or other means, to maximize heat absorption. The absorbing surface member may be substantially flat, as shown in the illustration or, alternatively may be corrugated, pleated, wrinkled, or otherwise shaped in such a manner as to increase the surface area thereof. In addition, if desired, the backing member 4 and absorbing surface member 15 may be formed of the same material as an integral unit.

The absorber panel 15 may be held in place by a pressure fit, that is by fitting absorber panel 15 between the side insulation 14 and slotted flange 3 in the manner shown. Alternatively, the engagement of the absorber panel 15 with the side wall member may be made or augmented with the use of other attaching means, such as nails, screws, bolts, glue or other means.

The glazing panel, that is, cover panel assembly 1, set forth in FIG. 3, comprises an outer transparent pane or sheet 9 and an inner cover 10 bonded and fastened at the edge rail 12. Between the outer sheet 9 and the inner cover 10 is an array of pleated thin film spacers 11, which serves as convection trap-spacer to limit heat loss through convection currents, and to insure uniform spacing between inner cover 10 and outer 9.

The elements of the cover panel assembly, with the exception of the edge rail are of materials that are preferentially transparent to a major portion of the solar spectrum, especially ultraviolet and visible light radiation and preferentially opaque to infra-red radiation. Thus, the outer sheet 9 may be composed, for example, of glass, such as commercial soda-lime-silica glass, polymethacrylate, such as the materials sold under such trademarks as LUCITE and PLEXIGLASS, polyester or the like. The preferred material for this purpose is a fiberglass-reinforced polyester sheet such as 0.040 inch Kalwall, (available from Kalwall Corp., Manchester, N.H.). The inner cover 10 is preferably a thin sheet or film of suitably transparent material. A preferred material for this purpose is a polymer film such as polyvinyl fluoride film. A preferred film useful for this purpose is 0.004 ind Tedlar ® film (E. I. DuPont de Nemours, Wilmington, Del.). The pleated film spacer 11 is also preferably of polyvinyl fluoride, most preferably in the form of a film having a thickness less than that of inner cover 10. Various other suitably transparent films, such as clear polyester film, polyvinyl chloride film or the like may also be employed for the inner cover 10 and pleated spacer 11. In a preferred form, the pleated spacer 11 is characterized by pleats spaced approximately 3 to 5 inches apart.

The edge rail 12 may be made of any suitable structural material such as metal, plastic, wood, or the like and bonded to the cover assembly in a suitable fashion, such as by glueing, crimping, riveting, bolting or the like. In a preferred embodiment, the edge rail 12 is formed of aluminum having a longitudinal slot into which the edge of outer sheet 9 alone or together with inner cover 10 may be inserted. The aluminum rail may then be fastened by crimping or pressing and thus closing the slot tightly on the outer sheet to form a bonded edge rail thereon. The edge rail may be constructed with teeth spaced within the slot to more firmly engage the cover sheet when it is crimped thereon. Alternatively, the edge rail may be attached to the cover panel assembly with the aid of rivets, adhesives or other means. Alternatively, the edge rail may be formed as an integral part of the cover assembly by rolling, bending, or otherwise shaping the edge of the fiberglass-reinforced outer sheet 9 to form a bead or rolled or bent edge thereon to serve as an edge rail of the proper size to be held in a non-rigid fashion in channel 8. An edge rail is preferably formed on two parallel sides of the cover panel assembly to be inserted in the channel portion 8 of two sidewall members, typically for installation between two adjacent roof joists of a building.

Referring again to FIG. 2, the cover panel assembly is held in a non-rigid fashion to the side wall member by the enclosure of edge rail 12 within channel portion 8. The edge rail 12 may be placed within the channel 8 by inserting one end into the end of the channel and sliding longitudinally until the channel is properly positioned coincident with the cover panel assembly. Preferably, however, the channel 8 is initially fabricated with opening 13 of sufficient size to permit the edge rail 8 to be passed therethrough and the channel then closed in a jaw-like fashion by crimping or pressing to close the opening 13 to the desired size to hold the edge rail in a non-rigid fashion as shown in FIG. 2.

The term "transparent" as employed herein to describe the cover panel assembly is intended to mean either transparent or translucent, that is of such optical properties as to permit the transmittance therethrough of solar energy, especially visible light.

The solar energy collector units of this invention may be pre-assembled or assembled on site and adapted in size and shape to conform to the architectural or constructional requirements of a particular building construction. It is to be understood that the collector units of this invention may be adapted, in a known manner, for the passage therethrough of a heat transfer fluid, such as air, to transfer the heat collected for distribution and/or storage. Such heat transfer systems are known in the art and may be employed with the solar energy collector units of this invention. For this purpose, inlet and outlet air ducts may be installed in the collector units, in a known manner, for example, in the end caps thereof or in the absorber panel to permit the passage of air therethrough by convection or forced circulation.

The various embodiments of the present invention as disclosed herein serve to illustrate the invention but are not intended to limit it. It will be appreciated that various changes and modifications of the solar energy collector unit of this invention may be made without departing from the spirit and scope of the invention.

What is claimed is:

1. A solar energy collector comprising:
   A. a box-like structure including side walls, a chassis back panel and an open top;
   B. a substantially rectangular cover panel assembly for totally covering said open top and being capable of transmitting solar energy and having an edge rail along two opposing edges thereof, each of said edge rails comprising a protrusion or deformation and forming the edge of said cover panel;
   C. a solar energy absorber panel, approximately coextensive with the cover panel assembly and positioned within said collector;
   D. two of said side walls being defined by opposing structural chassis side wall members, each having an upper channel portion with an opening along one side of the channel portion, the openings of said chassis side wall members being positioned to face each other to support the cover panel therebetween, each of said channels being of suitable interior dimension to enclose and retain but non-rigidly engage the edge rail of the cover panel assembly.

2. A solar energy collector according to claim 1 wherein the structural chassis side wall members each have a lower slotted flange adapted to receive and hold the energy absorber panel in spaced relation to the cover panel assembly.

3. A solar energy collector according to claim 2 wherein each structural chassis side wall member is characterized by a mounting flange on the opposite side of the channel portion thereof, the mounting flange being adapted for mounting on framing members of a frame building.

4. A solar energy collector according to claim 3 wherein the mounting flange is characterized by one or more openings for the insertion of fastening means.

5. A solar collector according to claim 4 wherein said openings are in the form of slots to allow free linear expansion of the side wall member relative to a building framing member to which the mounting flange is attached.

6. A solar energy collector according to claim 2 wherein the cover panel assembly comprises an outer transparent or translucent pane and an inner transparent or translucent sheet and an intermediate transparent or translucent pleated film space element.

7. A solar energy collector according to claim 6 wherein the outer pane is a fiberglass-reinforced polyester.

8. A solar energy collector according to claim 7 wherein the inner sheet and the intermediate pleated film spacer element are each polyvinyl fluoride.

9. A solar energy collector according to claim 8 wherein the cover panel assembly is in the form of a panel which is concave in a direction inward from the absorber panel.

* * * * *